(12) United States Patent
Rice

(10) Patent No.: US 12,305,805 B1
(45) Date of Patent: May 20, 2025

(54) FLUID DRAIN PAN WITH STOWABLE POURING STAND

(71) Applicant: Craig Rice, Bristol, IN (US)

(72) Inventor: Craig Rice, Bristol, IN (US)

(73) Assignee: Craig Rice, Bristol, IN (US)

( * ) Notice: Subject to any disclaimer, the term of this patent is extended or adjusted under 35 U.S.C. 154(b) by 0 days.

(21) Appl. No.: 18/959,791

(22) Filed: Nov. 26, 2024

(51) Int. Cl.
*B65D 1/34* (2006.01)
*F16N 31/00* (2006.01)

(52) U.S. Cl.
CPC ................................. *F16N 31/004* (2013.01)

(58) Field of Classification Search
CPC ...... F16N 31/02; F16N 31/006; F16N 31/002; F16N 31/004; B65D 81/261; B65D 90/24; Y10T 137/5762; Y10T 137/5907; B67C 11/00; B67D 7/845
USPC ............................ 220/571, 573; 141/98, 331
See application file for complete search history.

(56) References Cited

U.S. PATENT DOCUMENTS

| | | | |
|---|---|---|---|
| 4,195,710 A | 4/1980 | Garrison | |
| 4,296,838 A * | 10/1981 | Cohen | B60R 17/00 184/106 |
| 5,360,039 A | 11/1994 | Verrilli | |
| 6,273,155 B1 * | 8/2001 | Cacho | F16N 31/004 141/331 |
| 8,210,389 B2 | 7/2012 | Treslo | |
| 2009/0261109 A1 * | 10/2009 | Mirza | F16N 31/004 220/571 |

* cited by examiner

*Primary Examiner* — King M Chu
(74) *Attorney, Agent, or Firm* — Sanders Pianowski, LLP

(57) ABSTRACT

A drain pan has a reservoir portion with a funnel plate for collecting drained fluids. The funnel plate has sloped surfaces to direct fluids towards a drain screen, with one of those surfaces spaced from the reservoir to form a spout for pouring out the collected fluids. A deployable leg is attached to the reservoir adjacent the spout for elevating the reservoir while pouring out the collected fluids. The leg has a foot portion for resting on the ground or other horizontal surface.

19 Claims, 5 Drawing Sheets

FLUID DRAIN PAN WITH STOWABLE POURING STAND

BACKGROUND OF THE INVENTION

The present disclosure relates to devices for fluid collection, such as trays and pans that are used for engine oil, transmission fluid, antifreeze, and other fluid changes that require the used/spent fluid to be drained. Many devices are available to collect, transport, and store spent fluids, but little thought is put in for transferring the spent fluid into a more permanent storage or transport vessel, such as a bulk storage tank or recycling facility. Currently available drain pans are not intended to transport the spent fluid, so the user must transfer the fluid into another container. Drain pans are made to be low profile to allow them to slide and fit underneath a vehicle, and containers for transporting the spent fluid have a higher opening, so the user must balance the drain pan while pouring into the container. This leads to spillage. Further, drain pans are not practical to hold fluid for transport, as they are placed on the ground and commonly splashed with spent fluid, making the outside greasy or otherwise too dirty to be placed inside a vehicle for transport. Therefore, an improved device is needed.

SUMMARY OF THE INVENTION

The present disclosure describes a device for collecting and dispensing fluid that includes a reservoir and a deployable leg. The reservoir has a bottom wall joined to upstanding walls, with the upstanding walls affixed to adjacent upstanding walls to form a vessel with a top edge. One of the upstanding walls is a spout wall that is obliquely angled with respect to the bottom wall. A funnel plate is affixed to the reservoir between the top edge and the bottom wall to form a boundary between an interior volume and an exterior. The funnel plate has a drain extending therethrough to create a first path of fluid communication between the exterior and the interior volume. The funnel plate has a plurality of sloped surfaces extending towards the drain, with the sloped surfaces being angled with respect to the bottom wall to direct fluid towards the drain. The funnel plate is spaced from the spout wall to form a spout to create a second path of fluid communication between the exterior and the interior volume. The deployable leg is connected to the reservoir and is pivotable about a leg axis between a stowed position and a deployed position. The leg axis is parallel to the spout wall. The deployable leg has a stand portion and a foot portion extending perpendicularly therefrom. In the stowed position, the stand portion overlays the bottom wall and the foot portion is adjacent to one of the upstanding walls. In the deployed position, the leg axis is located between the leg and the reservoir and the foot portion is clear of the upstanding walls.

DESCRIPTION OF THE PREFERRED EMBODIMENT

Figure 1:
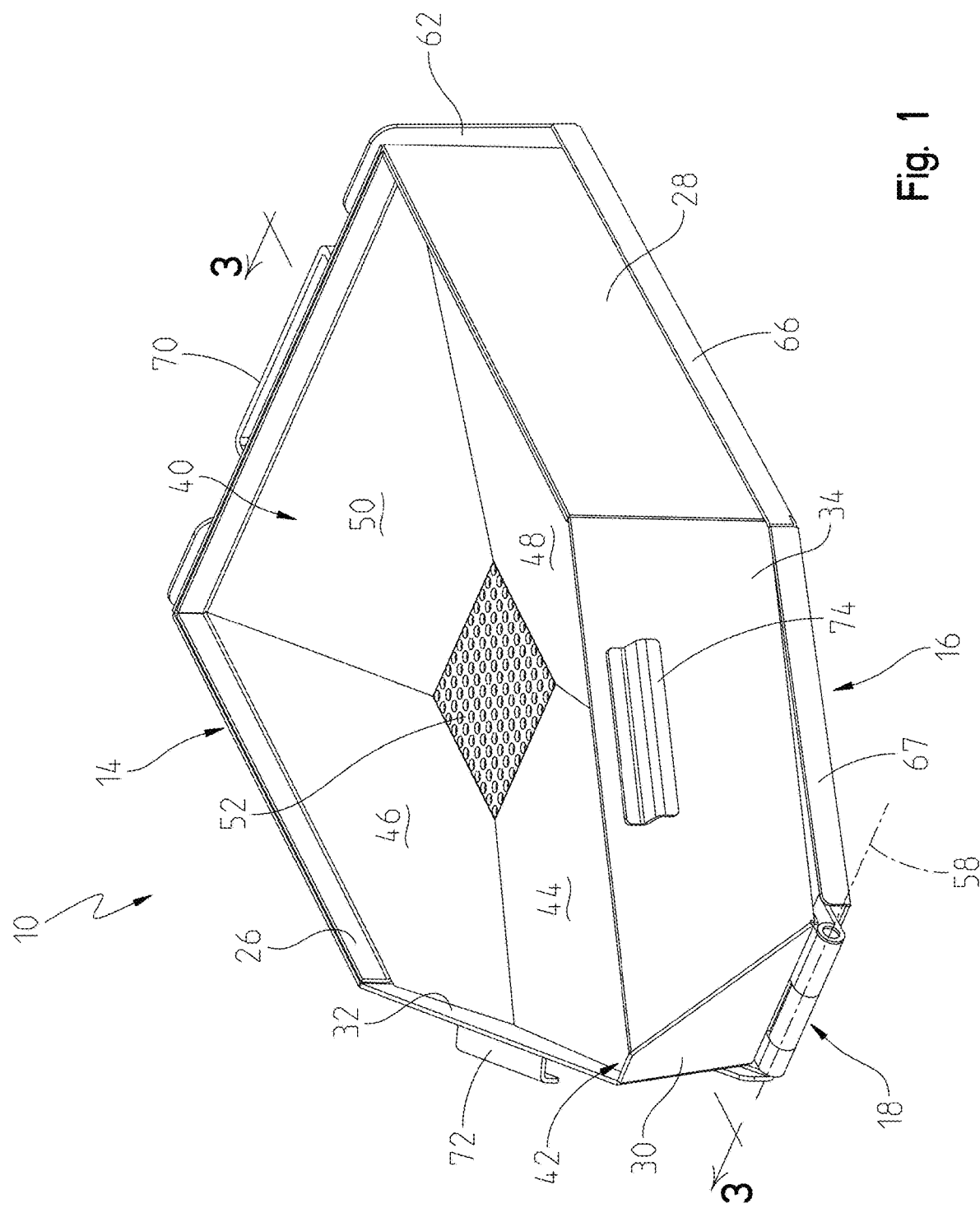
FIG. 1 is an isometric front view of the drain pan.

A fluid drain pan 10 as shown in FIGS. 1-4 is used for collecting spent fluid 12 from a vehicle, engine, or other apparatus (not shown). The pan 10 has a reservoir 14 and a deployable leg 16 that is attached to the reservoir portion 14 at a hinge 18.

The reservoir 14 has a bottom wall 20 that is attached to upstanding side walls, including a back wall 24, side walls 26, 28, chamfer walls 32, 34, and an angled spout wall 30. The back wall 24, side walls 26, 28 and chamfer walls 32, 34 extend substantially perpendicularly from the bottom wall. Substantially perpendicularly is defined as 90 degrees+/−10 degrees to allow for manufacturing tolerances, draft angles, or the like. The spout wall 30 is obliquely angled with respect to the to the bottom wall 20. In the embodiment shown herein, the angle is approximately 120 degrees, but other angles are contemplated. The walls 24, 26, 28, 30, 32, 34 are joined to each other and to the bottom wall 20 to form a container with a top edge 38 that can hold fluids. The top edge 38 forms a plane that is parallel to the bottom wall 20. As shown in FIG. 1, the spout wall 30 is trapezoidal with the widest part where it meets the bottom wall 20 and the narrowest part at the top edge 38. The chamfer walls 32, 34 are angled towards each other and the spout wall 30 is affixed between them where the chamfer walls are closest together. It is contemplated that the spout wall 30 is triangular and the chamfer walls 32, 34 meet near the top edge 38.

Located in the open top of the reservoir 14 is a funnel plate 40. The funnel plate 40 is located between the bottom wall 20 and the top edge 38. The funnel plate 40 also extends between the back wall 24, side walls 26, 28, and chamfer walls 32, 34 but stops short of the spout wall 30, leaving a gap to allow pouring. The chamfer walls 32, 34, spout wall 30, and gap cooperate to form a pouring spout 42. The pouring spout is one of the fluid paths between the interior of the reservoir and the exterior. As shown, the funnel plate 40 has sloped wall portions, including a front portion 44, side portions 46, 48, and a rear portion 50. The sloped wall portions are angled to slope towards a center drain 52. The drain 52 is shown as an array of small holes extending through the funnel plate 40, but other structures are contemplated, such as a mesh, particulate filter, or removable screen. The drain 52 is a second fluid path between the interior of the reservoir and the exterior and it prevents larger items, such as fasteners, drain plugs, washers, debris, or other objects from falling into the reservoir 14. It is further contemplated that the drain 52 has a cover, cap, or other device to block the fluid path through the drain. The funnel plate 40 in the embodiment shown herein is attached to the reservoir 14, but it is contemplated that it is removable for cleaning.

The reservoir 14 has handles 70, 72, 74 for moving and/or lifting. Pour handle 70 is affixed to the back wall 24 and front handles 72, 74 are affixed to their respective chamfer walls 32, 34. The pour handle 70 is used to lift and rotate the reservoir 14 as shown in FIGS. 4 and 5.

Figure 2:
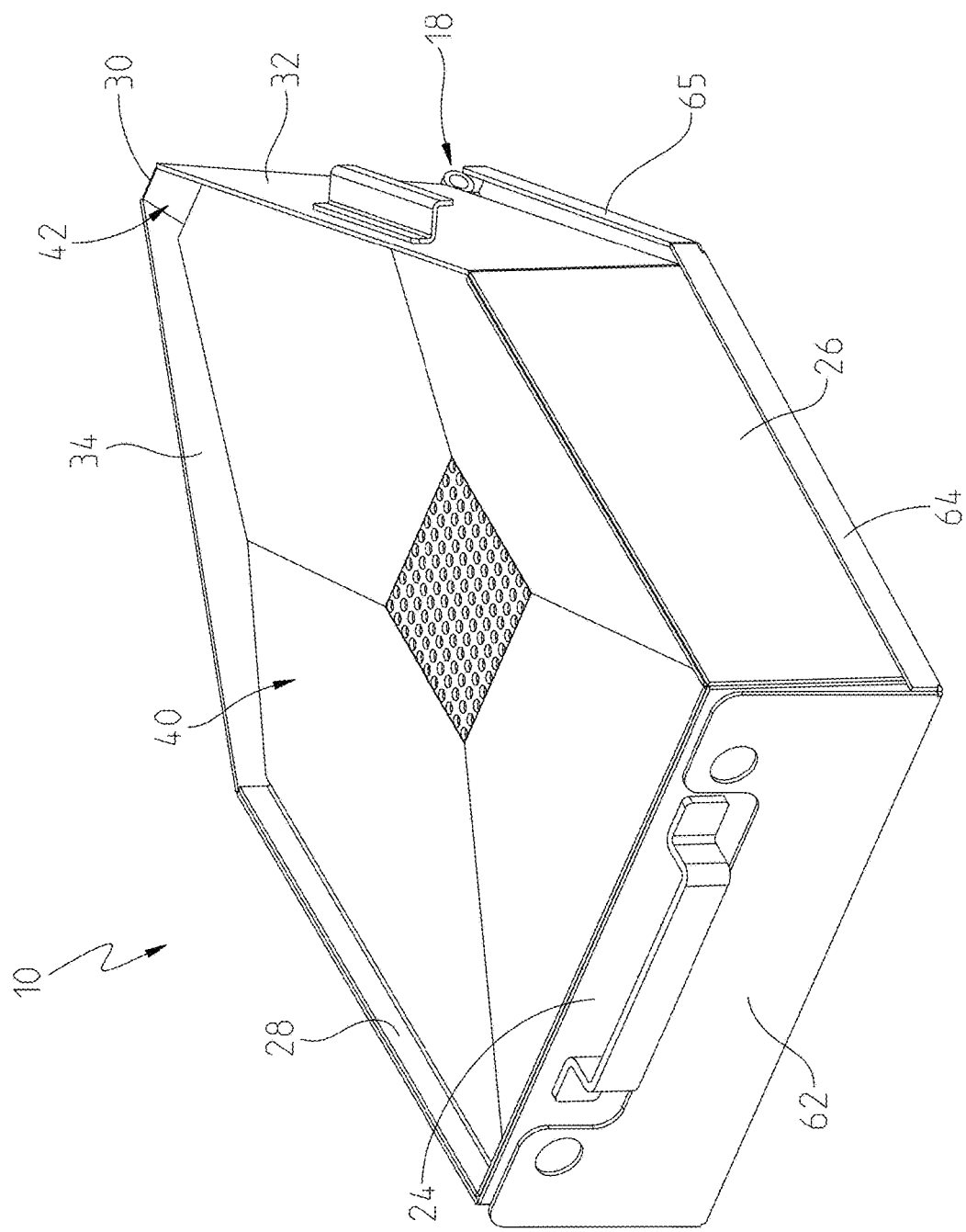
FIG. 2 is an isometric rear view of the drain pan in FIG. 1.
Figure 3:
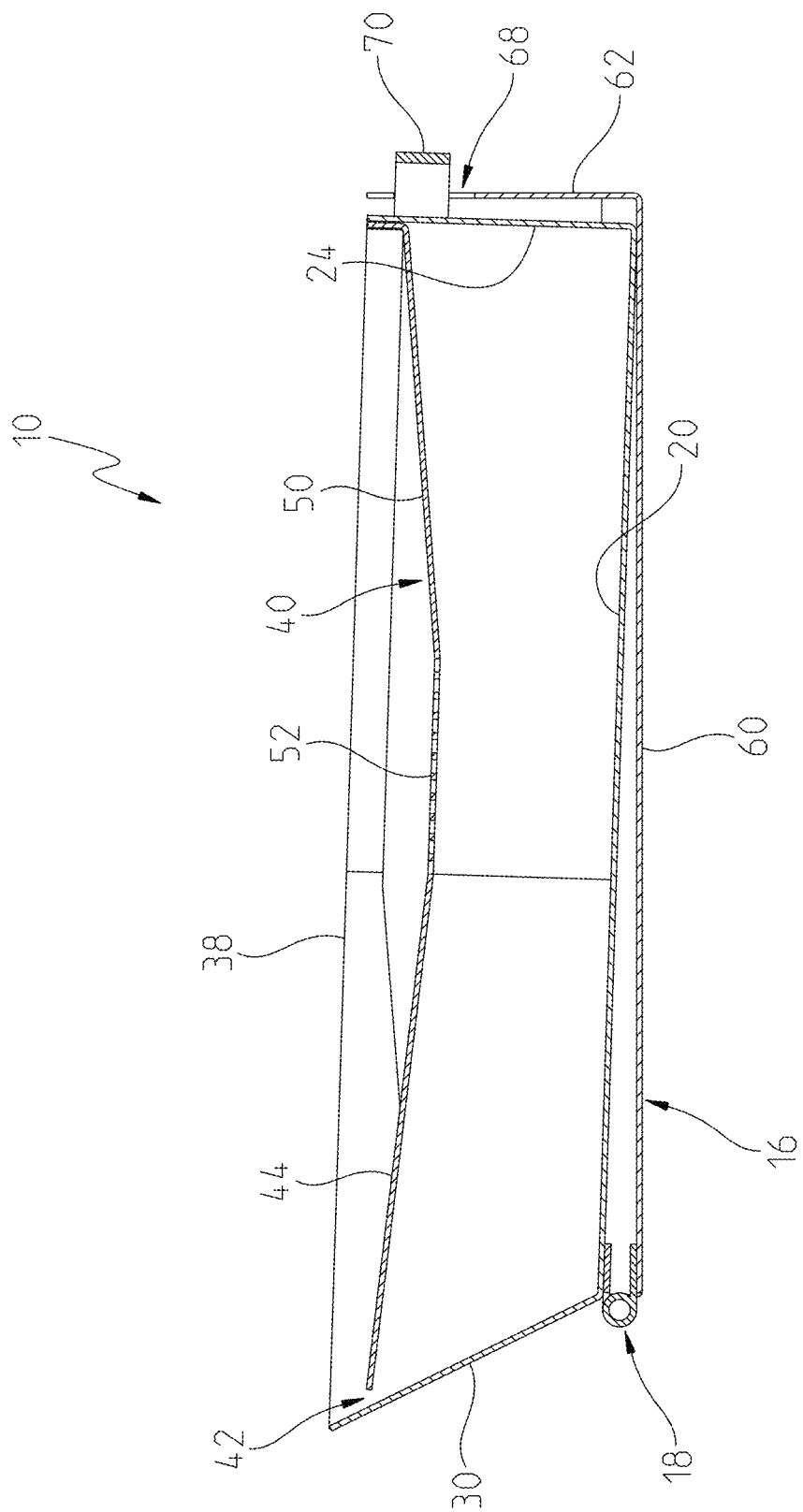
FIG. 3 is a side section view 3-3 of the drain pan in FIG. 1.
Figure 4:
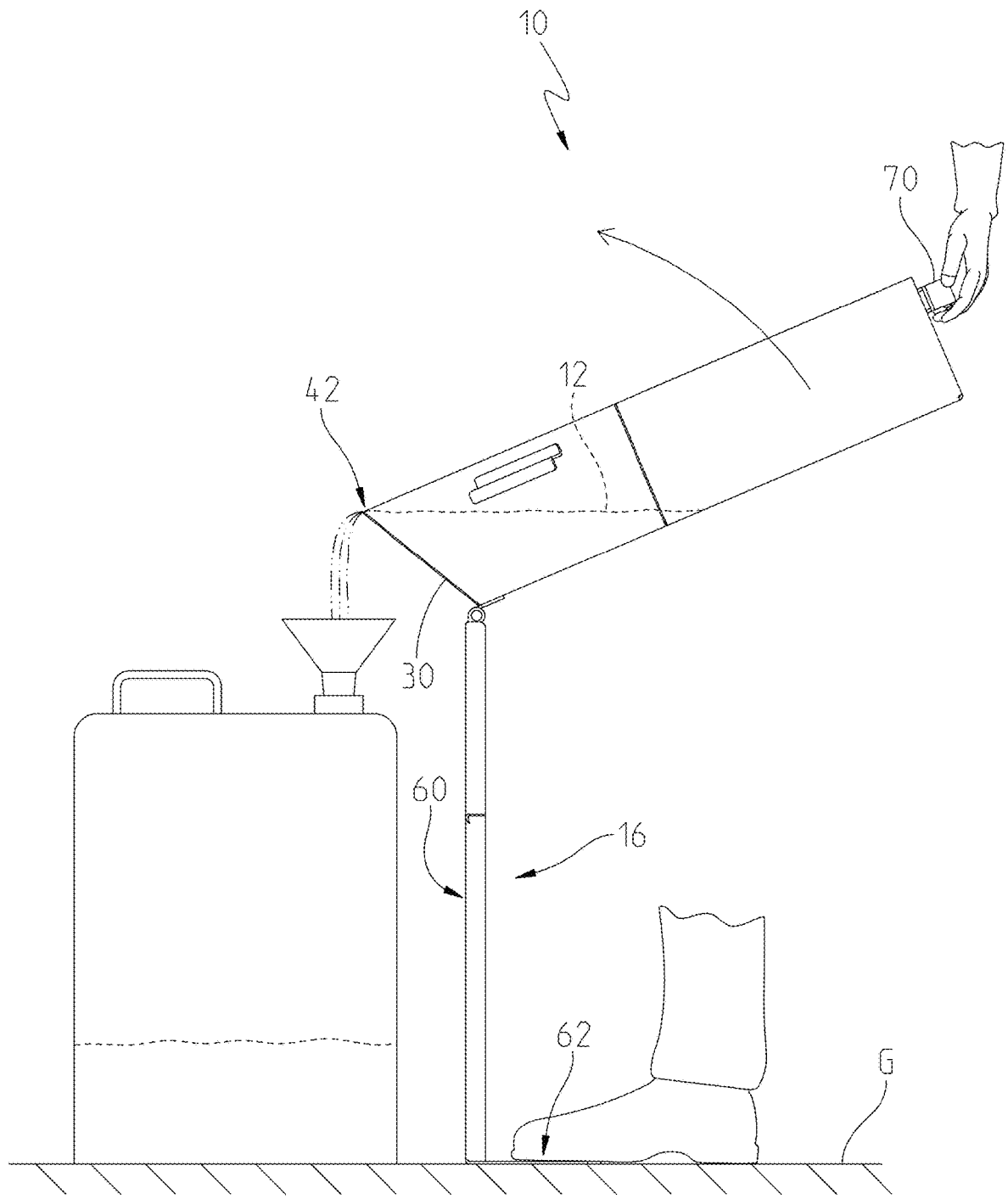
FIG. 4 is a side view of the drain pan pouring spent fluid into a storage container.
Figure 5:
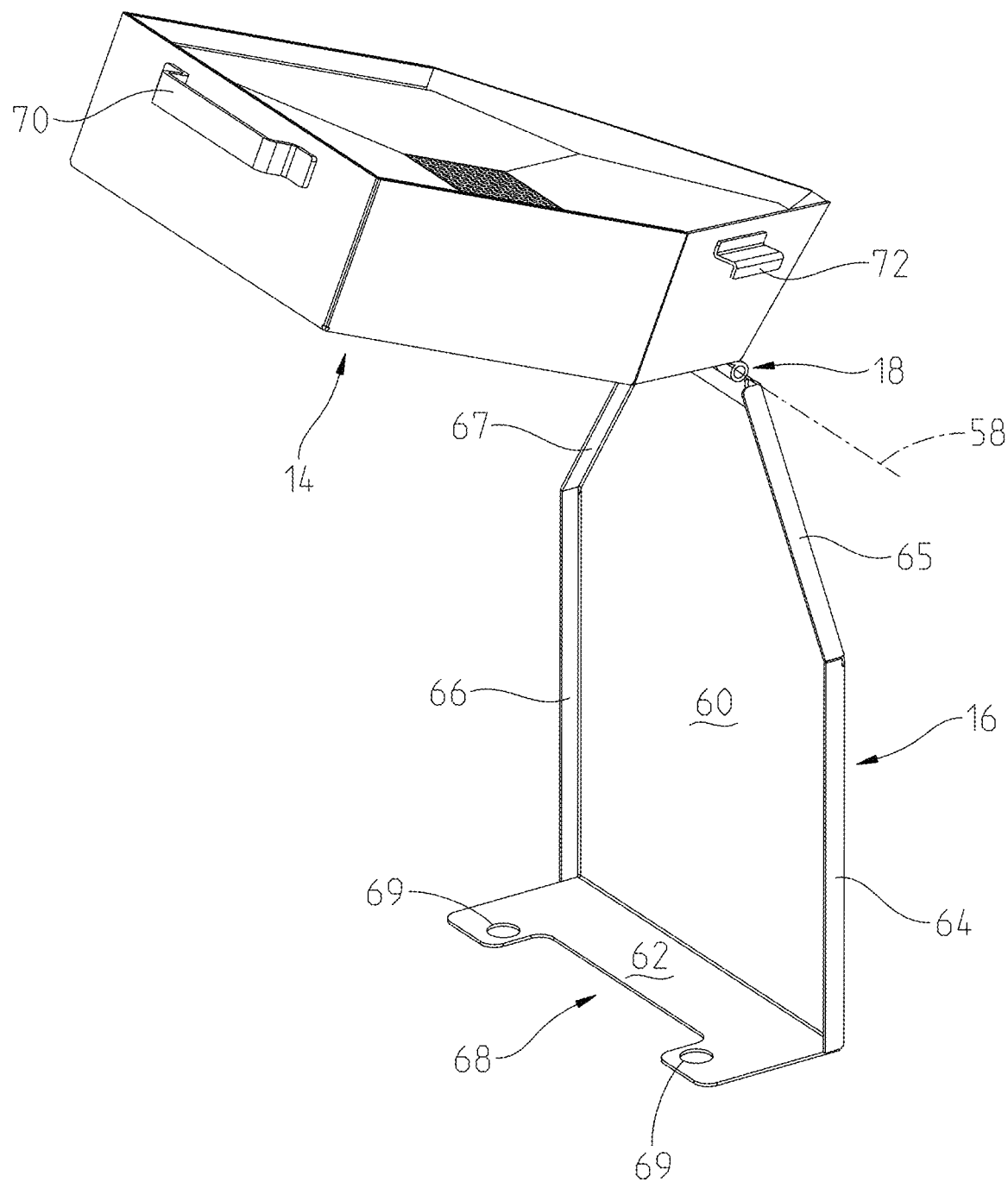
FIG. 5 is an isometric rear view of the drain pan with the leg in the deployed position.

The hinge 18 allows the deployable leg 16 to pivot on a leg axis 58 between a stowed position as shown in FIGS. 1-3 and a deployed position as shown in FIGS. 4-5. The leg 16 has a stand portion 60 and a foot portion 62 that extends perpendicularly from the stand portion 60. The stand portion 60 is flat and has a perimeter profile that is similar to the bottom wall 20. The stand portion 60 includes stiffening flange walls 64, 65, 66, 67 that extend perpendicularly in the same direction as the foot portion 62. When the leg 16 is in the stowed position, the flange walls 64, 65, 66, 67 are adjacent their respective upstanding side walls. The foot portion 62 has a clearance notch 68 to allow the leg 16 to pivot to the stowed position without interfering with the pour handle 70. Adjacent to the clearance notch 68 are apertures 69 that extend through the foot portion 62. The apertures 69 allow the user to retain the deployable leg 16 in the stowed position when lifting or carrying the drain pan 10. It is further contemplated that a magnetic catch, snap, or other retain/release mechanism could be used to retain the deployable leg 16 in its stowed position.

To use the drain pan 10, the user slides or places it underneath the engine, transmission, or other apparatus holding the spent fluid 12. The drain pan is resting on the ground or other horizontal surface G with the stand portion 60 of the leg 16 in the stowed position. The spent fluid 12 is then released, where it falls to the funnel plate 40. If it contacts one of the sloped wall portions, gravity directs it to the drain 52, where it falls again and contacts the bottom wall, where it begins to fill the interior volume. As the spent fluid 12 continues to drain, it continues to collect in the reservoir 14. When the spent fluid 12 is done draining, the user then removes the pan 10 from underneath the engine, transmission, or other apparatus, sliding or carrying it using the handles 70, 72, 74. The user then can drain the spent fluid 12 from the reservoir 14 by allowing the deployable leg 16 to pivot away from the reservoir 14. This is accomplished by releasing a finger from an aperture 69 (or releasing another catch device). The user then rests the foot portion 62 on the ground G and lifts the pouring handle 70, which directs the spent fluid towards the spout wall 30 and out through the spout 42. As the angle between the stand portion 60 and bottom wall increases to an obtuse angle as shown in FIG. 4, the spent fluid 12 flows through the spout 42. For increased stability, the user can place a foot or weight on the foot portion 62. When pouring spent fluid 12, the leg 16 supports the reservoir 14 with the leg axis 58 being located between the reservoir 14 and the leg 16.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A device for collecting and dispensing fluid comprising:
   a reservoir having a bottom wall joined to upstanding walls, said upstanding walls affixed to adjacent said upstanding walls to form a vessel with an open top, one of said upstanding walls is a spout wall obliquely angled with respect to said bottom wall;
   a funnel plate is affixed to said reservoir adjacent to said open top to form a boundary between a partially enclosed interior volume and an exterior, said funnel plate having a drain extending therethrough in fluid communication between said exterior and said interior volume, said funnel plate having a plurality of sloped surfaces surrounding and extending towards said drain, said sloped surfaces obliquely angled with respect to said bottom wall, said funnel plate is spaced from said spout wall to form a pouring spout in fluid communication between said exterior and said interior volume; and
   a deployable leg connected to said reservoir and pivotable about a leg axis between a stowed position and a deployed position, said leg axis parallel to said spout wall, said deployable leg having a stand portion and a foot portion extending therefrom, in said stowed position, said stand portion overlays said bottom wall and said foot portion is adjacent to one of said upstanding walls, in said deployed position, said leg axis is located between said leg and said reservoir and said foot portion is clear of said upstanding walls.

2. The device in claim 1, wherein said drain is closer to said bottom wall than said sloped surfaces.

3. The device in claim 1, wherein one of said upstanding walls is a back wall located opposite said spout wall, a pouring handle is affixed to said back wall.

4. The device in claim 1, wherein said spout wall is trapezoidal, a widest point of said spout wall is located where said spout wall meets said bottom wall, a narrowest point of said spout wall is located at said open top.

5. The device in claim 1, wherein two of said upstanding walls are chamfer walls being angled towards each other, said spout wall is affixed between said chamfer walls where said chamfer walls are closest to each other, said chamfer walls and said spout wall cooperate to form said pouring spout.

6. The device in claim 1, wherein said stand portion is perpendicular to said foot portion.

7. The device in claim 1, wherein said stand portion is located between said leg axis and said foot portion.

8. A device for collecting and dispensing fluid comprising:
   a reservoir having a bottom wall joined to surrounding upstanding walls, said upstanding walls terminating at a top edge;
   a funnel plate affixed to said reservoir adjacent said top edge to define a boundary between an interior volume and an exterior, said funnel plate having a drain extending therethrough in fluid communication between said exterior and said interior volume;
   said reservoir having a pouring spout where two of said upstanding walls are joined, said funnel plate is spaced from said pouring spout to allow fluid communication between said exterior and said interior volume, a trapezoidal spout wall, a widest point of said spout wall is located where said spout wall meets said bottom wall, a narrowest point of said spout wall is located at said top edge;
   a deployable leg having a stand portion affixed to a foot portion extending perpendicularly therefrom; and
   said deployable leg is pivotable with respect to said reservoir about a leg axis between a stowed position and deployed position, said leg axis is located opposite said foot portion.

9. The device in claim 8, wherein said funnel plate has a plurality of sloped planar surfaces surrounding and extending towards said drain, said sloped planar surfaces are obliquely angled with respect to said bottom wall.

10. The device in claim 9, wherein said drain is closer to said bottom wall than said sloped surfaces.

11. The device in claim 8, wherein one of said upstanding walls is a back wall located opposite of said pouring spout, a pouring handle is affixed to said back wall.

12. The device in claim 8, wherein two of said upstanding walls are chamfer walls being angled towards each other, a spout wall is affixed between said chamfer walls where said chamfer walls are closest to each other, said chamfer walls and said spout wall cooperate to form said pouring spout.

13. The device in claim 8, wherein each of said upstanding walls are substantially perpendicular to said bottom wall.

14. A device for collecting and dispensing fluid comprising:
   a reservoir having a bottom wall joined to upstanding walls, said upstanding walls affixed to adjacent said upstanding walls to form a vessel with a top edge, one of said upstanding walls is a spout wall obliquely angled with respect to said bottom wall;
   a funnel plate is affixed to said reservoir between said top edge and said bottom wall to form a boundary between an interior volume and an exterior, said funnel plate having a drain extending therethrough in a first path of fluid communication between said exterior and said interior volume, said funnel plate having a plurality of sloped surfaces extending towards said drain, said sloped surfaces obliquely angled with respect to said bottom wall, said funnel plate is spaced from said spout wall to form a pouring spout with a second path of fluid communication between said exterior and said interior volume; and
   a deployable leg connected to said reservoir and being pivotable about a leg axis between a stowed position and a deployed position, said leg axis parallel to said spout wall, said deployable leg having a stand portion and a foot portion extending perpendicularly therefrom, in said stowed position, said stand portion overlays said bottom wall and said foot portion is adjacent to one of said upstanding walls, in said deployed position, said leg axis is located between said leg and said reservoir and said foot portion is clear of said upstanding walls.

15. The device in claim 14, wherein one of said paths of fluid communication are selectively closeable.

16. The device in claim 14, further comprising a pouring handle affixed to one of said upstanding walls and located oppositely said pouring spout.

17. The device in claim 16, wherein said foot portion has an aperture extending therethrough, said aperture is adjacent said pouring handle when said deployable leg is in said stowed position.

18. The device in claim 14, further comprising an angle between said bottom wall and said stand portion, when said angle is obtuse, liquid in said interior volume is pourable through said pouring spout.

19. The device in claim 14, wherein said top edge is parallel to said bottom wall.

* * * * *